United States Patent [19]

Nihei

[11] 4,249,813
[45] Feb. 10, 1981

[54] FIXTURE FOR ELECTRONIC FLASH

[75] Inventor: Takahiro Nihei, Hachioji, Japan

[73] Assignee: Olympus Optical Co., Ltd., Tokyo, Japan

[21] Appl. No.: 60,339

[22] Filed: Jul. 25, 1979

[30] Foreign Application Priority Data

Aug. 1, 1978 [JP] Japan .......................... 53/106385[U]

[51] Int. Cl.³ ....................... G03B 15/03; H01R 27/00
[52] U.S. Cl. .................................... 354/128; 354/145; 339/33
[58] Field of Search ............................... 354/126–128, 354/145, 149; 339/32 R, 33

[56] References Cited

U.S. PATENT DOCUMENTS

| 3,252,394 | 5/1966 | Jakob et al. ........................ 354/126 |
| 3,971,050 | 7/1976 | Okuno et al. ....................... 354/128 |
| 4,030,108 | 6/1977 | Yazaki et al. ....................... 354/27 |

Primary Examiner—L. T. Hix
Assistant Examiner—Thomas H. Tarcza
Attorney, Agent, or Firm—Weinstein & Sutton

[57] ABSTRACT

A fixture for an electronic flash includes a connection terminal which enables a synchronized flashlight illumination and another connection terminal which is used to transmit an electrical signal to a camera which is indicative of the completion of a charging operation or a flashlight illumination of an electronic flash. The fixture is constructed to retract said another connection terminal from its abutting surface on a usual hot shoe or an accessory shoe of a camera whenever the electronic flash is mounted thereon, thereby preventing an electrical short-circuiting of said another terminal by the surface.

8 Claims, 13 Drawing Figures 4,249,813

FIXTURE FOR ELECTRONIC FLASH

BACKGROUND OF THE INVENTION

The invention relates to a fixture for an electronic flash, and more particularly, to such fixture including a connection terminal utilized for synchronized flashlight illumination and another connection terminal which is used to transmit an electrical signal indicative of the completion of a charging operation or the completion of a flashlight illumination of an electronic flash to a camera on which it is mounted, and enabling an electronic flash to be detachably mounted on a hot shoe of the camera. Such an electronic flash will be referred to hereafter as "of the kind specified."

A conventional fixture for an electronic flash is illustrated in FIGS. 1 and 2. Referring to these Figures, there is shown electronic flash 1 having fixture 2 which is provided on the bottom surface thereof. Fixture 2 has connection member 3 in the form of a square plate which is adapted to be fitted into guide groove 8 formed in hot shoe 7 (see FIG. 2) that is provided on the top surface of a camera. Subsequently, fixing knob 4 may be turned to secure connection member 3 to shoe 7, thus mounting electronic flash 1 on the camera. It will be seen that a plurality of connection terminals are provided on bottom surface 3a of connection member 3, including centrally located terminal 5 which is used to permit a synchronized flashlight illumination, and connection terminals 6a, 6b located on the opposite sides thereof and which are used to transmit an electrical signal to the camera which is indicative of the completion of a charging operation or the completion of a flashlight illumination of the electronic flash. These terminals are provided in the form of retractable dowels.

Hot shoe 7 includes an inner bottom surface 7a which is adapted to be engaged by bottom surface 3a of connection member 3. Three connection terminals 10, 11a, 11b are disposed in a layout corresponding to terminals 5, 6a, 6b. It is to be understood that terminals 10, 11a, 11b are electrically insulated from each other by forming part of bottom wall of hot shoe 7 with insulating member 9, and remain exposed. As indicated by an arrow a, connection member 3 of the electronic flash is inserted into guide groove 8 from the rear side.

FIG. 3 shows hot shoe 12 of a more usual camera which has single connection terminal 14 alone that is used for providing a synchronized flashlight illumination. Only region 13 of the bottom surface of hot shoe 12 is electrically insulated by an insulating member while the remainder is formed by an electrically conductive member such as metal, so that when electronic flash 1 having fixture 2 is mounted on such hot shoe 12, the conductive material of the bottom surface of shoe 12 will short-circuit connection terminals 6a, 6b, causing a malfunctioning or possibly destroying the function of electronic flash 1. It will be understood that the same difficulty occurs also when electronic flash 1 is mounted on a usual accessory shoe which has no synchronized flashlight terminal.

SUMMARY OF THE INVENTION

It is an object of the invention to provide a fixture for an electronic flash which eliminates the described disadvantage and which permits the connection terminal that is used to transmit an electrical signal to a camera is automatically retracted from its mating surface whenever the described electronic flash is mounted on a camera having a usual accessory shoe or a more general hot shoe.

In accordance with the invention, there is provided a fixture for an electronic flash of the kind specified including a connection terminal used for a synchronized flashlight illumination and another connection terminal transmitting an electrical signal and which permits the signal transmitting terminal to be retracted from its mating surface of a hot shoe of usual camera which only has a synchronized flashlight illumination terminal whenever the electronic flash is mounted thereon. This prevents the signal transmitting terminal from being short-circuited by a metallic surface of the hot shoe to thereby cause a malfunctioning of or damage to the electronic flash. And yet the synchro terminal is electrically connected with a corresponding terminal of the hot shoe, thereby enabling a synchronized flash photography. Also, when the electronic flash of the kind specified is mounted on a devoted hot shoe, both connection terminals of the electronic flash are reliably connected with corresponding terminals provided on the part of the camera, thus allowing a synchronized flash photography as well as the display function of indicating the completion of a charging operation or of a flashlight illumination.

DESCRIPTION OF PREFERRED EMBODIMENTS

Figure 4:
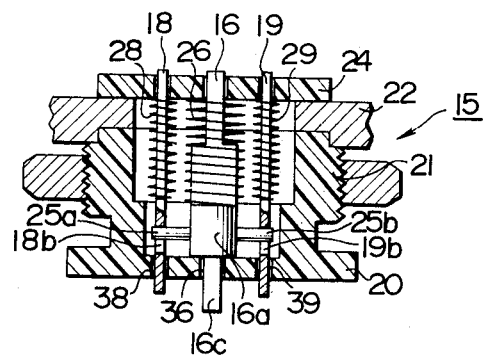
FIG. 4 is an enlarged elevational section of a fixture according to one embodiment of the invention.

Referring to FIG. 4, there is shown fixture 15 according to one embodiment of the invention. Fixture 15 includes body 21 in the form of a short sleeve of an insulating material which is secured to the lower surface of bottom wall 22 of an electronic flash, and the lower end of the body is integrally formed with connection member 20 in the form of a square plate which may be fitted into a camera shoe. Retracting member 16 and three connection terminals 17, 18, 19 (see also FIG. 6) are disposed between connection member 20 and insulating support plate 24 which is disposed on top of bottom wall 22 in alignment with the top opening of body 21 so as to be vertically movable therebetween.

In the present embodiment, connection terminal 17 is used for enabling a synchronized flashlight illumination, and is electrically connected with a synchro circuit within the camera through connection terminal 47 (see FIG. 5) provided on the part of the camera shoe. Connection terminals 18, 19 are utilized to transmit an electrical signal indicative of the completion of a charging operation or the completion of a flashlight illumination to a display circuit within the camera through corresponding connection terminals 48, 49 (see FIG. 5) provided on the part of the camera shoe.

Figure 6:
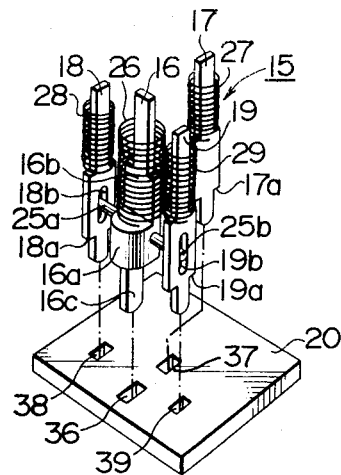
FIG. 6 is a perspective view illustrating the general arrangement of connection terminals in the fixture of FIG. 4.

Referring to FIG. 6, connection terminal 17 is formed by an electrically conductive material, and has a region of an increased width intermediate its end. Its lower end having a reduced width and is adapted to be loosely fitted into slot 37 formed in connection member 20, and is urged to project below the bottom surface of the latter, by coiled spring 27 which is disposed on its top portion and bearing against the region of increased width. The resulting downward movement is limited by the abutment of lower step 17a of such region against the upper surface of connection member 20. Other connection terminals 18, 19 are formed in substantially the same manner as terminal 17, and are located symmetrically on the opposite sides of terminal 17 at a position forwardly thereof or to the left thereof, as viewed in FIG. 6. It is to be noted that these terminals extend in parallel relationship with each other. Their lower ends having a reduced width are loosely fitted into slots 38, 39 formed in connection member 20, and are urged to project below the bottom surface of the latter, by coiled springs 28, 29 (see FIG. 6) disposed on their top portion also having a reduced width. As with connection member 17, their downward movement is limited by the abutment of lower steps 18a, 19a of their regions having an increased width against the upper surface of connection member 20. The central regions of terminals 18, 19 which have an increased width are formed with vertically elongate slots 18b, 19b, respectively, which are engaged by lift pins 25a, 25b carried by retracting member 16, as will be further described later.

Figure 3:
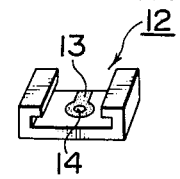
FIG. 3 is a perspective view of a hot shoe of a more usual camera which is only provided with a connection terminal used to permit a synchronized flashlight illumination.

The purpose of retracting member 16 is to displace both connection terminals 18, 19 upwardly to avoid their contact with the bottom surface of hot shoe 12 whenever fixture 15 is mounted on an accessory shoe or usual hot shoe 12 (see FIG. 3). Specifically, retracting member 16 is disposed intermediate connection terminals 18, 19 in parallel relationship therewith. This member is molded from an electrically insulating synthetic resin or like material, and is centrally formed with a forwardly extending semi-elliptical bulge 16a. Plate-shaped projection 16b extends upwardly from a rear portion of the upper surface of bulge 16a, while a front portion of the lower surface thereof is formed with tab-like depending piece 16c. Lift pins 25a, 25b are fixedly mounted on the opposite sides of bulge 16a toward the rear end thereof and extend horizontally in a symmetrical manner. The lower end of depending piece 16c is loosely fitted into slot 36 formed in connecting member 20, and is urged to project below the bottom surface of the latter, by coiled spring 26 disposed on projection 16b. However, the resulting movement is limited by the abutment of the lower surface of bulge 16a against the upper surface of connecting member 20. As will be noted from FIG. 4, the length of projection of depending piece 16c below the bottom surface of connection member 20 is greater than the length of projection of the lower ends of terminals 17, 18, 19.

Figure 2:
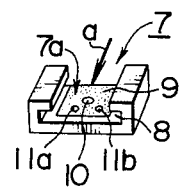
FIG. 2 is a perspective view of a hot shoe which may be used in combination with the fixture of FIG. 1.
Figure 5:
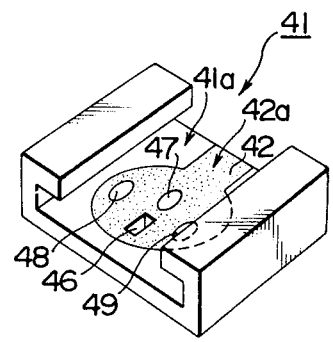
FIG. 5 is an enlarged perspective view of a hot shoe on which the fixture of FIG. 4 may be mounted.

FIG. 5 shows devoted hot shoe 41 which is designed for use with fixture 15. Hot shoe 41 is similar in configuration and appearance to conventional hot shoe 7 shown in FIG. 2, except that recess 46 is formed at a position which is aligned with slot 36 in connection member 20 when fixture 15 is mounted thereon. Inner bottom surface 41a of hot shoe 41 is partly formed by an electrically insulating material as indicated at 42 to present insulating surface 42a on which connection terminals 47, 48, 49 on the part of the camera are disposed exposed so as to be aligned with slots 37, 38, 39 formed in connection member 20 of the fixture when the latter is mounted on the shoe.

Figure 7:
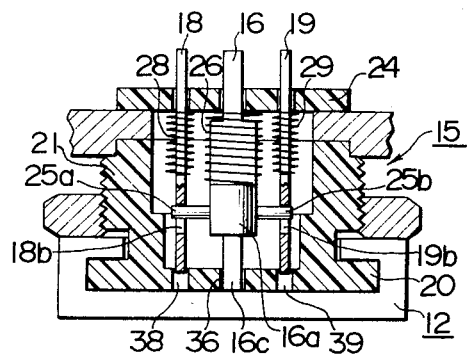
FIGS. 7 and 8 are elevational cross sections of the fixture shown in FIG. 4 in different operative positions.

The operation of fixture 15 will now be described with reference to FIGS. 4, 7 and 8. In FIG. 4, fixture 15 is shown alone before it is mounted on the hot shoe. At this time, the respective lower ends of terminals 17 to 19 and retracting member 16 project through slots 37, 38, 39 and 36, respectively, under the resilience of their associated coiled springs 27, 28, 29 and 26, respectively. As shown, the length of projection of depending piece 16c of retracting member 16 is greater than that of other connection terminals.

When fixture 15 is mounted on conventional hot shoe 12 shown in FIG. 3, the inner bottom surface of hot shoe 12 which represents a single plane causes terminals 17 to 19 and member 16 to be raised upwardly against the resilience of coiled springs 26 to 29 through individual strokes which correspond to the lengths of projection of respective members. However, because retracting member 16 has a greater length of projection than the other terminals, lift pins 25a, 25b fixedly mounted thereon and which engage slots 18b, 19b formed in terminals 18, 19 cause the latter to be raised through an additional stroke, whereby the lower ends of these terminals are completely retracted upwardly from the bottom surface of connection member 20, as shown in FIG. 7. The upward displacement of connection terminals 18, 19 prevents the described interferences from occuring which are caused by their contact with the bottom surface of hot shoe 12. On the other hand, terminal 17 is allowed to engage connection terminal 14 (see FIG. 3) on hot shoe 12, independently from the described movement of retracting member 16, thus enabling a synchronized flash photography. Thus it will be seen that fixture 15 of the invention can also be used with hot shoe 12 of a usual camera for enabling a synchronized flash photography.

Figure 8:
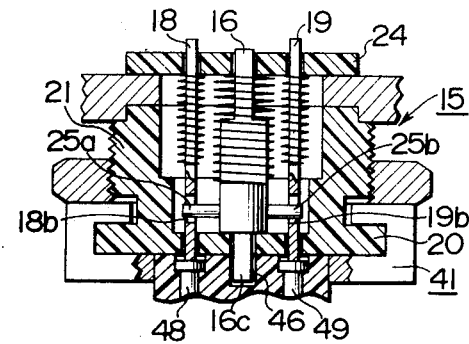

When fixture 15 is properly mounted on devoted hot shoe 41 (see FIG. 5) having connection terminals 47 to 49 which mate with connection terminals 17 to 19 of the fixture, depending piece 16c is allowed to enter recess 46 formed in hot shoe 41, thus permitting member 16 to move down through an additional stroke, as shown in FIG. 8. Although connection terminals 18, 19 will remain above their corresponding connection terminals 48, 49 if recess 46 were absent, the downward movement of member 16 through the additional stroke permit them to move down into engagement with connection terminals 48, 49. Thus, all of terminals 17 to 19 are properly connected with corresponding connection terminals 47 to 49 provided on the part of the camera.

Retracting member 16 may be formed of an electrically conductive material with lift pins 25a, 25b formed of an insulating material so that retracting member 16 may be used as a connection terminal associated with a synchronized flashlight illumination and engaging with a mating terminal disposed in the bottom of recess 46 of hot shoe 41, with a similar effect. This provides a more simplified construction.

Figure 9:
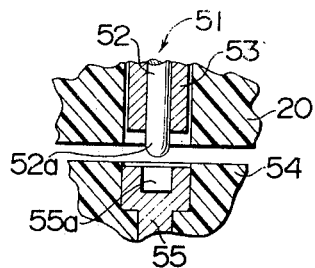
FIGS. 9 to 11 are fragmentary, enlarged cross sections of different forms of a connection terminal which may be used in the fixture of the invention.

The described result can also be achieved by embedding members, which correspond to retracting member 16, within connection terminals 18, 19 so that the free end of such members projects therefrom, and by providing corresponding recesses in connection terminals 48, 49 which receive these members. Specifically, such an arrangement is shown in FIG. 9. In this Figure, connection terminal 51 is used to transmit a signal to a camera. It comprises terminal retracting member 52 in the form of an insulating shank which is fixedly received within cylindrical member 53 formed of an electrically conductive material. A camera has hot shoe 54 in which connection terminal 55 which mates with connection terminal 51 is provided. Terminal 55 is disposed flush with or slightly recessed from the surface of hot shoe 54, and is formed with recess 55a which is adapted to receive end 52a of retracting member 52 which projects beyond cylindrical member 53. In use, it will be understood that unless hot shoe 54 is formed with connection terminal 55 having recess 55a formed therein, retracting member 52 prevents conductive cylindrical member 53 from engaging connection terminal 55, thus achieving the same result as before with a simplified construction.

Figure 10:
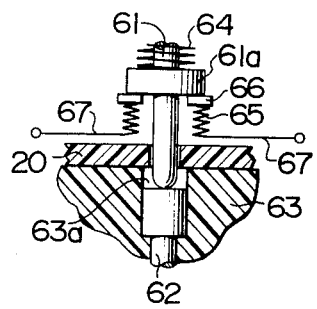

FIG. 10 shows an alternative arrangement. Specifically, connection terminal 61 also serves as a terminal retracting member. Terminal 61 is in the form of a shank of an electrically conductive material having flange 61a intermediate its length. Connection terminal 62 provided on the part of a camera is disposed in recess 63a, and is spaced from the surface of hot shoe 63. Spring 64 bears against flange 61a to urge it downward, while electrically conductive piece 66 is disposed below the flange and is supported by springs 65, the conductive piece being electrically connected with lead wire 67 which is connected with a signal transmitting circuit of an electronic flash. When the lower end of connection terminal 61 is inserted into recess 63a to engage connection terminal 62, the signal transmitting circuit of the electronic flash is connected with a corresponding display circuit of the camera through a path including flange 61a, conductive piece 66, spring 65 and lead wire 67. However, when the fixture carrying such connection terminal 61 is mounted on hot shoe 12 as shown in FIG. 3 which is not provided with recess 63a, the free end of connection terminal 61 bears against the surface of hot shoe 12, whereby flange 61 remains spaced from conductive piece 66, preventing an interconnection between the signal transmitting circuit and the display circuit.

Figure 11:
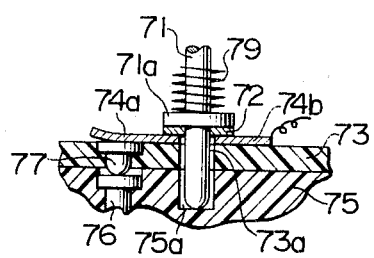

FIG. 11 shows a further arrangement in which a terminal retracting member is used as a switch operating member so that an output from the signal transmitting circuit to the display circuit can be switched on and off. Specifically, retracting member or switch operating member 71 is in the form of a shank of an insulating material having flange 71a intermediate its length. It is normally urged downward by spring 79 which bears against flange 71a. Conductive disc 72 is adhesively secured to the lower surface of flange 71a. The fixture includes connection member 73 which is formed with slot 73a for receiving the lower end of member 71. Recess 75a is formed in the upper surface of hot shoe 75 in alignment with slot 73a. A pair of spaced, resilient conductive blades 74a, 74b are disposed on the upper surface of connection member 73, and are electrically connected together through conductive disc 72 as operating member 71 moves down abuts against them.

One end of conductive blade 74a is arranged to depress the upper end of signal transmitting terminal 77 which is disposed below it, and the other conductive blade 74b is connected with a signal transmitting circuit within the electronic flash. Terminal 77 is in the form of a headed stud which is disposed in connection member 73 so as to be vertically movable, the lower end of terminal 77 projecting below the bottom surface of connection member 73. Connection terminal 76 provided on the part of the camera is recessed into the surface of hot shoe 75, and has its upper end face exposed.

Figure 12:
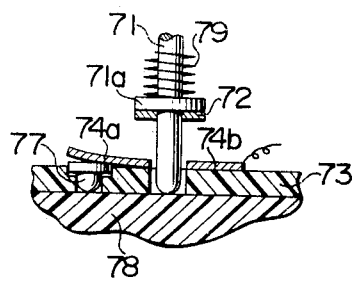
FIG. 12 is a similar cross section of the connection terminal shown in FIG. 11 illustrating its operative position.

In use, when the fixture is properly mounted on devoted hot shoe 75, the lower end of switch operating member 71 is permitted to enter recess 75a in hot shoe 75, whereby conductive plate 72 simultaneously engages both conductive blades 74a, 74b, achieving an electrical interconnection therebetween. A display circuit within the camera is then connected with the signal transmitting circuit within the electronic flash through a path including engaging connection terminals 76, 77, blade 74a, conductive plate 72 and blade 74b. However, when the fixture is mounted on hot shoe 78 of a usual camera shown in FIG. 12 which is not formed with recess 75a (see FIG. 11), a full downward movement of switch operating member 71 is prevented, so that conductive plate 72 cannot bridge across conductive blades 74a, 74b. At this time, connection terminal 77 remains isolated from the electrical circuit of the electronic flash and cannot cause any problem whatsoever if it bears against the surface of hot shoe 78. It should be understood that while the arrangements of FIGS. 9 to 11 are shown for a single connection terminal, the same arrangement may be used for two or more terminals.

Figure 1:
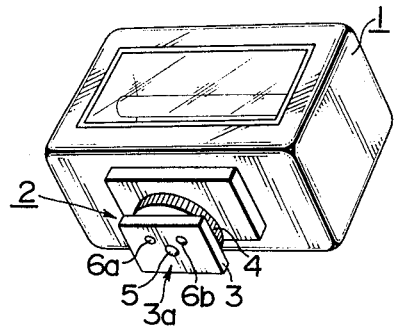
FIG. 1 is a perspective view of an exemplary, conventional fixture for an electronic flash which is provided with a plurality of electrical connection terminals.
Figure 13:
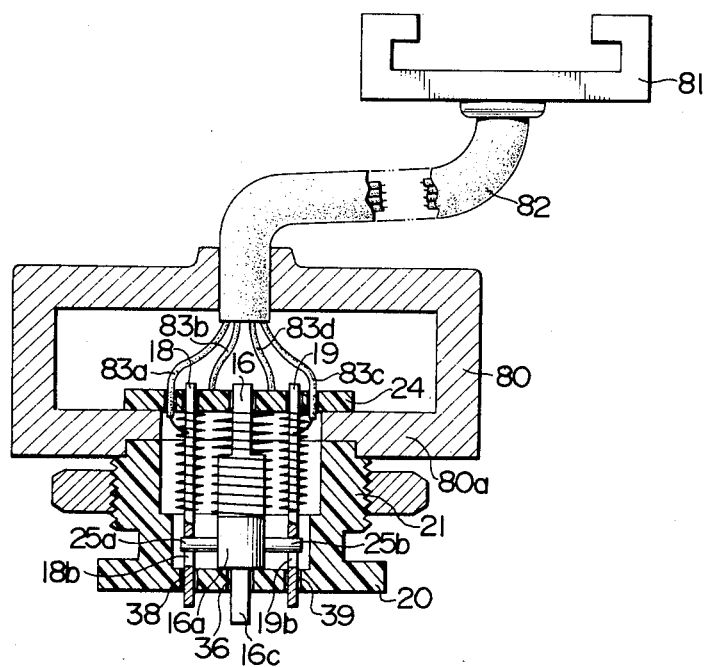
FIG. 13 is an elevational enlarged cross section of a fixture according to another embodiment of the invention.

In the preceding embodiments, the fixture has been integrally constructed with an electronic flash. However, the invention can be applied by using a connection cord which has its one end connected with an electronic flash. Such an arrangement is shown in FIG. 13. The embodiment shown corresponds to that shown in FIG. 4. Hence corresponding parts are designated by like reference characters. Specifically, the fixture includes body 21. Rather than bottom wall 22 of an electronic flash, bottom wall 80a of connection box 80 is held between the top end of body 21 and insulating support plate 24. One end of four wire cord 82 is connected with respective connection terminals of the fixture within connection box 80, while its other end is connected with shoe 81 on which an electronic flash is mounted. Shoe 81 is of the type which is adapted to receive connection member 3 shown in FIG. 1. Respective connection terminals (not shown) of shoe 81 and its body are connected with lead wires 83a to 83d of cord 82. Within connection box 80, these wires extend through support plate 24 and are connected with terminals 17 to 19 as well as the metal body 21. In this manner, connection box 80 surrounds and protects the interconnection between lead wires 83a to 83d and the corresponding terminals of the fixture with which it is integrally coupled, thereby enabling the electronic flash to be removed from the camera in order to project flashlight illumination in any desired orientation with respect to an object being photographed.

What is claimed is:

1. A fixture for electronic flash comprising a body including a connection member which is adapted to be detachably mounted on a shoe of an associated camera, a first connection terminal and a second connection terminal disposed within the body, the first terminal being utilized to enable a synchronized flashlight illumination from an electronic flash and the second terminal being used to transmit an electrical signal to a camera which is indicative of the completion of a charging operation or the completion of a flashlight illumination of an electronic flash, and a terminal retracting member disposed in the body for causing a movement of the second terminal away from the shoe to disable the electrical connection thereof when the fixture is mounted on a shoe which is not provided with a connection terminal adapted to mate with the second connection terminal of the fixture.

2. A fixture according to claim 1 in which the second terminal and the retracting member are mounted on the body in a manner to permit their retraction into the body, but are normally urged to cause their respective ends to project beyond the lower surface of the connection member, the length of projection of the retracting member being greater than that of the second terminal.

3. A fixture according to claim 2 in which the second terminal is formed with a lengthwise elongate slot which is engaged by a lift pin fixedly mounted on the retracting member and which provides an electrical insulation between the second terminal and the retracting member, whereby the second terminal is adapted to move integrally with the retracting member.

4. A fixture according to claim 3 in which the retracting member is formed by an electrical conductor which also serves as the first terminal.

5. A fixture according to claim 2 in which the second terminal is in the form of a cylindrical member of an electrically conductive material in which a shank of an insulating material is fixedly mounted to provide the retracting member which is integral with the second terminal.

6. A fixture according to claim 1 in which the second connection terminal is in the form of a shank of an electrically conductive material which has a flange intermediate its length, the shank also serving as a terminal retracting member and being movable into and out of the body of the fixture and normally urged to have its one end projecting beyond the bottom surface of the connection member, whereby the flange is normally maintained in contact with a conductive member associated with a signal transmitting circuit of the electronic flash, the flange moving away from the conductive member to interrupt its electrical connection with the signal transmitting circuit whenever the mounting of the connection member with a camera shoe causes a displacement of the second connection terminal into the body of the fixture.

7. A fixture according to claim 1 in which the terminal retracting member is in the form of a switch operating member which comprises a shank of an insulating material having a conductive plate, the switch operating member being movable into and out of the body of the fixture and normally urged to have its one end projecting beyond the bottom surface of the connection member, whereby the conductive plate is maintained in contact with a resilient conductive blade associated with a signal transmitting circuit of the electronic flash, thereby completing the circuit, the blade causing the second terminal to project beyond the bottom of the connection member the conductive plate moving away from the resilient conductive blade to open the signal transmitting circuit whenever the retracting member is caused to be displaced into the body of the fixture.

8. A fixture according to claim 1, further comprising a connection box mounted on top of the body of the fixture and within which the first and the second connection terminal of the fixture are connected with one end of a multi-wire cord, the other end of which is connected with corresponding connection terminals provided on a shoe which is adapted to receive an electronic flash.

* * * * *

UNITED STATES PATENT AND TRADEMARK OFFICE
CERTIFICATE OF CORRECTION

PATENT NO. : 4,249,813
DATED : February 10, 1981
INVENTOR(S) : Takahiro Nihei

It is certified that error appears in the above—identified patent and that said Letters Patent is hereby corrected as shown below:

Column 1, line 45, change "a" to --$\underline{a}$--.

Column 1, line 67, change "is" at the second occurrence to --to be--.

Column 2, line 10, before "usual", insert --a--.

Column 4, lines 6 and 55, and Column 6, lines 21 and 22, change "devoted" to --dovetailed--.

Signed and Sealed this

Fifth Day of May 1981

[SEAL]

Attest:

RENE D. TEGTMEYER

Attesting Officer      Acting Commissioner of Patents and Trademarks